and so on.

United States Patent [19]

Numata et al.

[11] 4,100,118

[45] Jul. 11, 1978

[54] THERMOSETTING RESIN COMPOSITION

[75] Inventors: Shun-ichi Numata, Hitachi; Hitoshi Yokono, Katsuta; Junji Mukai, Hitachi, all of Japan

[73] Assignee: Hitachi, Ltd., Japan

[21] Appl. No.: 620,760

[22] Filed: Oct. 8, 1975

[30] Foreign Application Priority Data

Oct. 11, 1974 [JP] Japan ............................ 49-116105

[51] Int. Cl.$^2$ ............................................. C08G 73/06
[52] U.S. Cl. .............................. 260/18 PT; 260/18 EP
[58] Field of Search .......... 260/18 PT, 18 EP, 47 EP, 260/2 EP

[56] References Cited

U.S. PATENT DOCUMENTS

| 3,057,809 | 10/1962 | Newey | 260/47 EA |
| 3,299,008 | 1/1967 | Mueller | 260/2 EA |

FOREIGN PATENT DOCUMENTS

2,359,386   6/1974   Fed. Rep. of Germany ...... 260/77.5

*Primary Examiner*—Eugene C. Rzucidlo
*Attorney, Agent, or Firm*—Craig & Antonelli

[57] ABSTRACT

A novel thermosetting resin composition consisting essentially of (a) one equivalent of a polyfunctional epoxy compound containing 10 to 80% by weight of a polyglycidyl ester of a fatty acid, (b) 1.5 to 5 equivalents of a polyfunctional isocyanate compound and (c) 0.01 to 10% by weight of a curing catalyst based on the total weight of the polyfunctional epoxy compound and the polyfunctional isocyanate compound. A cured product having excellent thermal resistance and excellent thermal shock resistance which is suitable for the molding of a large apparatus can be obtained by heating said thermosetting resin composition.

29 Claims, 4 Drawing Figures

THERMOSETTING RESIN COMPOSITION

The present invention relates to a novel thermosetting resin composition. More particularly, the invention pertains to a thermosetting resin composition consisting essentially of a polyfunctional epoxy compound containing a polyglycidyl ester of a fatty acid, a polyfunctional isocyanate compound and a curing catalyst.

BACKGROUND OF THE INVENTION

It has heretofore been difficult to obtain both excellent thermal resistance and excellent thermal shock resistance as a molding resin for a large apparatus such as, for example, a large capacity rotary electric machine coil, a transformer coil, etc. Particularly, poor thermal shock resistance yields a defect that cracks develop on curing or by a thermal cycling. In general, a resin having excellent thermal resistance is hard and is low in thermal shock resistance. Therefore, a molding resin for a large apparatus requires thermal resistance of at least class F (155° C) and alicyclic epoxy resins have mainly been used therefor. Also, the thermal shock resistance has been improved by adding an inorganic filler to reduce the coefficient of linear expansion of the whole molding resin and thereby decrease a difference in coefficient of linear expansion between the resins and a molding apparatus. However, this method is limited since the fluidity of the resin composition reduces with an increase in the amount of the filler added.

It has been considered to soften the resin composition by adding a flexibilizer, but there has been in this method a problem that the heat distortion temperature is reduced and the thermal resistance is deteriorated.

German Offenlegungsschrift No. 2,359,386 discloses a thermosetting resin composition consisting essentially of one equivalent of a polyfunctional epoxy compound, 1.5 to 5.0 equivalents of a polyfunctional isocyanate compound and a catalyst. When the thermosetting resin composition is heated to a temperature of 80° C or more, isocyanurate rings and oxazolidone rings are formed and three-dimensional crosslinkage and curing occur. Thus, excellent thermal resistance (class H = 180° C) and excellent mechanical strengths at high temperatures which have never been obtained by prior art thermosetting resins can be obtained.

However, said cured product is unsatisfactory in thermal shock resistance as a molding resin for a large apparatus. Particularly, when an amount as large as 54 percent by volume of a filler was blended and the resulting composition was subjected to thermal shock test according to C-shaped washer method, cracks developed on thermal cycling at 180 to −30° C. However, the addition of such a large amount of a filler is practically questionable since the composition becomes difficult to flow.

German Offenlegungsschrift No. 2,440,953 discloses a process for improving the thermal shock resistance of a thermosetting resin having excellent thermal resistance which comprises using as said polyfunctional epoxy compound component an epoxy group-terminated oxazolidone prepolymer obtained by reacting a disocyanate compound with a stoichiometrical excess of a diepoxy compound. According to this process, such flexibility as required in coating film of paints and varnishes, etc. can be obtained, but sufficient thermal shock resistance as a molding resin for a large apparatus as aimed at in the present invention cannot be obtained. Also, since it is necessary for a molding resin to be solventless and the viscosity of such a prepolymer is too high to be used in the absence of a solvent, the process is practically questionable.

SUMMARY OF THE INVENTION

An object of the present invention is to provide a thermosetting resin having excellent thermal resistance.

Another object of the invention is to provide a thermosetting resin having excellent thermal shock resistance.

Other objects will be apparent from the following description.

DETAILED DESCRIPTION

As described above, according to the process which comprises using an oxazolidone prepolymer, parts containing no crosslinkage point produced by the oxazolidone prepolymer are formed in the polymer and the flexibility of the polymer is improved. However, this process is limited and cannot give satisfactory thermal shock resistance as a molding resin for a large apparatus which is an object of the present invention.

As a result of various studies on the improvement of said thermal shock resistance, the present inventors considered that satisfactory thermal shock resistance was unsable to be obtained by the prepolymer process since the crosslinkage density due to the trimerization of an isocyanate became high and thereby the resin became hard, and that it was necessary for improving it to introduce a straight chain part into the polymer positively or form parts having rubber elasticity.

As a result, it has been found that a thermosetting resin composition consisting essentially of (a) one equivalent of a polyfunctional epoxy compound containing 10 to 80% by weight of a polyglycidyl ester of a fatty acid, (b) 1.5 to 5 equivalents of a polyfunctional isocyanate compound and (c) 0.01 to 10% by weight of a curing catalyst based on the total weight of the polyfunctional epoxy compound and the polyfunctional isocyanate can accomplish the objects of the present invention.

Figure 1:
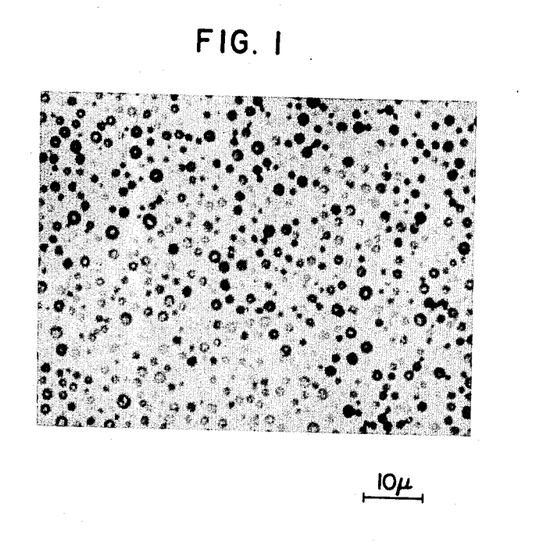
FIG. 1 is a microphotograph of the cured product as produced in Example 2.

After curing, the composition of the present invention shows such a section as shown in FIG. 1. A rigid resin part consisting mainly of a polyfunctional epoxy compound and a polyfunctional isocyanate compound forms a matrix, in which a flexible resin part consisting mainly of a polyglycidyl ester of a fatty acid and a polyfunctional isocyanate compound is uniformly distributed in the form of fine spheres. It resembles closely the state of an acrylic acid-butadiene-styrene copolymer (ABS resin) or high impact polystyrene. It is presumed that such a state gives both thermal resistance and thermal shock resistance.

If the amount of the polyglycidyl ester of the fatty acid in the polyfunctional epoxy compound component exceeds 80%, however the abovementioned state of the two parts is reversed and thermal resistance reduces suddenly. Said composition after curing shows such a state as shown in FIG. 1, but the composition before curing is uniformly mutually dissolved and varies from the neighborhood of its gelation point. Such a uniformly dispersed state cannot be obtained unless the components are compatible with one another when mixed together.

The polyglycidyl ester of the fatty acid used in the present invention can be obtained by known processes, for example, by epoxidizing with an epihalohydrin a polyfunctional fatty acid obtained by polymerizing an unsaturated fatty acid containing at least one unsaturated bond in the presence of a radical initiator. Also, it can be obtained by epoxidizing with an epihalohydrin a dimer obtained from an unsaturated fatty acid containing at least two unsaturated bonds and an unsaturated fatty acid containing at least one unsaturated bond by Diels-Alder reaction.

As said unsaturated fatty acid containing one unsaturated bond, for example, 4-decenoic acid, caproleic acid, linderic acid, lauroleic acid, tsuzuic acid, myristoleic acid, palmitoleic acid, petroselinic acid, oleic acid, vaccenic acid, gadoleic acid, erucic acid, selacholeic acid, etc. may be used. Also, as said unsaturated fatty acid containing two unsaturated bonds, linolic acid, linolenic acid, eleostearic acid, parinaric acid, arachidonic acid, etc. may be used. The number of carbon atoms in the polyfunctional fatty acid is preferably within a range of 25 to 43. If it is less than 25, thermal shock resistance becomes poor. Also, if it is more than 43, compatibility between the respective components when mixed together is deteriorated.

Also, the amount of the polyglycidyl ester of the fatty acid blended with said polyfunctional epoxy compound is 10 to 80% by weight, and is preferably 10 to 60% by weight in order to obtain thermal resistance of at least class H (180° C). In order that the composition can endure a temperature of −50° C or less in thermal shock test according to the C-shaped washer method as described below, a range of 20 to 60% by weight is desirable.

As said polyfunctional epoxy compound, bifunctional compounds such as diglycidyl ether of bisphenol A, diglycidyl ether of buntanediol, diglycidyl ester of phthalic acid, diglycidyl ester of isophthalic acid, diglycidyl ester of terephthalic acid, diglycidyl ester of tetrahydrophthalic acid, diglycidly ester of hexahydrophthalic acid, diglycidyl ester of methylnadic acid, butadienediepoxide, 4,4'-(1,2-epoxyethyl)biphenyl, diglycidyl ether of resorcinol, diglycidyl ether of phloroglucinol, diglycidyl ether of methylphloroglucinol, etc. and tri- or more-functional epoxy compounds such as triglycidyl ether of p-aminophenol, polyarylglycidyl ethers, 1,3,5-tri(1,2-epoxyethyl)benzene, 2,2',4,4'-tetraglycidoxybenzophenone, tetraglycidoxytetraphenylethane, polyglycidyl ethers of phenol-formaldehyde novolac resins, triglycidyl ether of glycerol, triglycidyl ether of trimethylolpropane, triglycidyl ester of trimellitic acid, tetraglycidyl ester of pyromellitic acid, etc. may be used.

Particularly, diglycidyl ether of bisphenol A, diglycidyl ester of phthalic acid, diglycidyl ester of isophthalic acid, diglycidyl ethers of terephthalic acid and polyglycidyl esters of phenol novolac resins are advantageous from the viewpoint of thermal resistance.

Also, as said polyfunctional isocyanate, bifunctional isocyanates such as methane diisocyanate, butane-1,1-diisocyanate, ethane-1,2-diisocyanate, butane-1,2-diisocyanate, propane-1,3-diisocyanate, 2-butene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilane diisocyanate, diphenylsilane diisocyanate, ω,ω'-1,3-dimethylbenzene diisocyanate, ω,ω'-1,4-dimethylbenzene dissocyanate, ω,ω'-1,3-dimethylcyclohexane diisocyanate, ω,ω'-1,4-dimethylcyclohexane diisocyanate, ω,ω'-1,4-dimethynaphthalene diisocyanate, ω,ω'-1,5-dimethylnaphthalene diisocyanate, cyclohexane-1,3-diisocyanate, cyclohexane-1,4-diisocyanate, dicyclohexylmethane-4,4'-diisocyanate, 1,3-phenylenediisocyanate, 1,4-phenylenediisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenylether-4,4'-diisocyanate, diphenylether-2,4'-diisocyanate, naphthalene-1,4-diisocyanate, naphthalene-1,5-diisocyanate, biphenyl-4,4'-diisocyanate, 3,3'-dimethylbiphenyl-4,4'-diisocyanate, 2,3'-dimethoxybiphenyl-4,4'-diisocyanate, diphenylmethane-4,4'-diisocyanate, 3,3'-dimethoxydiphenylmethane-4,4'-diisocyanate, 4,4'-dimethoxydiphenylmethane-3,3'-diisocyanate, diphenylsulfide-4,4'-diisocyanate, diphenylsulfon-4,4'-diisocyanate, etc. and tri- or more-functional isocyanates such as polymethylenepolyphenylisocyanates, tris(4-phenylisocyanate)thiophosphate, 3,3',4,4'-diphenylmethane-tetraisocyanate, etc. may be used.

Also, dimers and trimers of these isocyanates may be used. Aromatic isocyanates are useful particularly from the viewpoint of thermal resistance.

An equivalent ratio of the polyfunctional epoxy compound to the polyfunctional isocyanate is preferably within a range of 1:1.5 to 1:5.0. If the ratio is less than 1:1.5, the strengths at high temperatures an heat deterioration characteristic of the cured product are remarkably reduced. Also, if the ratio exceeds 1:5.0, the cured product becomes brittle and its thermal shock resistance becomes poor.

A catalyst plays an important part in the composition of the present invention. Thus, a so-called hetero ring-forming catalyst which forms isocyanurate rings and oxazolidone rings on curing is important. As such a catalyst, tertiary amines such as trimethylamine, triethylamine, tetramethylbutanediamine, tetramethylpentanediamine, tetramethylhexanediamine, etc. and hydroxyalkylamines such as dimethylaminoethanol, dimethylaminopentanol, etc. and various amines such as dimethylaniline, trisdimethylaminomethylphenol (DMP-30), N-methylmorpholine, N-ethylmorpholine, triethylenediamine, etc. are useful.

Also, quaternary ammonium slats containing a long chain alkyl group of 8 or more carbon atoms such as cetyltrimethylammonium bromide, cetyltrimethylammonium chloride, dodecyltrimethylammonium iodide, trimethyldodecylammonium chloride, benzyldimethyltetradecylammonium chloride, benzyldimethylpalmitylammonium chloride, dodecyltrimethylammonium bromide, benzyldimethylstearylammonium bromide, stearyltrimethylammonium chloride, benzyldimethyltetradecylammonium acetate, etc. may be used. Further, imidazoles such as 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl- 2-methylimidazole, 1-cyanoethyl-2-methylimidazole, 1-cyanoethyl-2-undecylimidazole, 1-cyanoethyl-2-phenylimidazole, 1-azine-2-methylimidazole, 1-azine-2-ethylimidazole, 1-azine-2-undecylimidazole, etc. are useful.

At least one of the above-mentioned hetero ring-forming catalysts may be used in an amount of 0.01 to 10% by weight on the weight of a mixture of said polyfunctional epoxy compound and said polyfunctional isocyanate compound.

Also, in order to improve further thermal shock resistance which is the object of the present invention, an inorganic filler is preferably added to reduce a coefficient of thermal expansion. As such a filler, silica, alumina, diatomaceous earth, glass powder, quartz glass powder, mica, clay, calcium carbonate, gypsum, magnesite, kaolin, talc, dolomite, graphite, carbon block, iron carbonyl, asbestos, cement, whisker, zircon, ferrite, molybdenum disulfide, zinc white titanium white, etc. which have heretofore been used are useful.

As for the amount of the inorganic filler blended, the inorganic filler may be added in an amount of up to 60% by volume based on the volume of the whole composition, but in the case of a casting resin, the amount is preferably within a range of 45 to 55% by volume from the viewpoint of the fluidity of the resin.

Also, if a coupling agent is added to improve the compatibility between the inorganic filler and the resin, the viscosity of the casting resin is reduced, resulting in an improvement in operability and an increase in the moisture resistance of the molded article after curing. As such a coupling agent, epoxysilane and aminosilane coupling agents are preferably used.

The compositions of the present invention are cured by heating at 50° to 250° C. Particularly, when a large apparatus is molded, the curing is preferably slowly effected at 70° to 130° C in the early stages to reduce strains during the curing and prevent cracks. At least until gelation occurs, the compositions are maintained in this state, and then the curing is completed by heating at 150° to 200° C.

Figure 2:
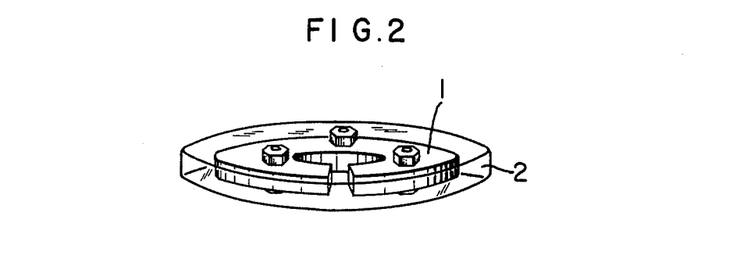
FIG. 2 shows a C-shaped washer test piece as molded for testing the thermal shock resistance of a thermosetting resin.
Figure 3:
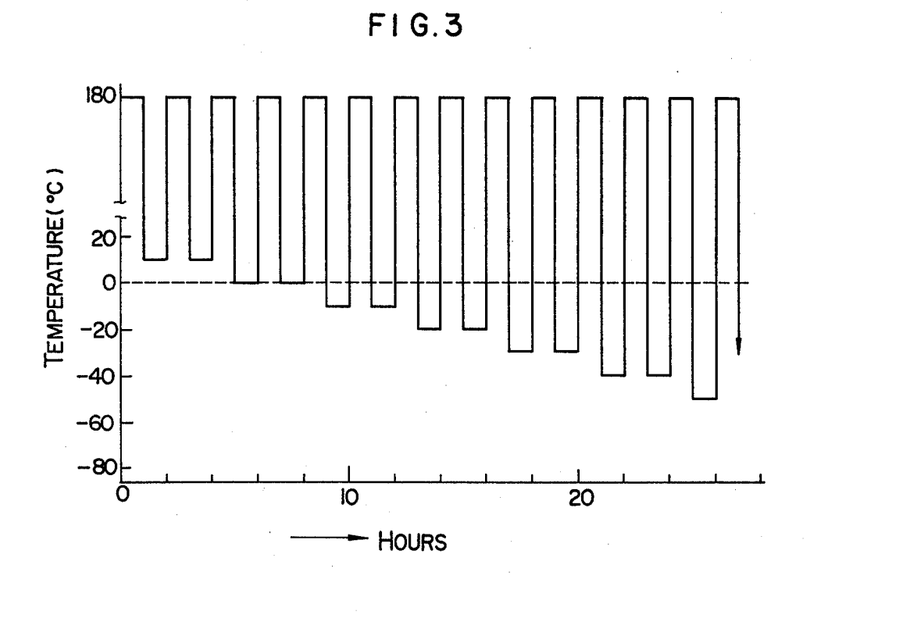
FIG. 3 shows the heat cycle schedule for said thermal shock resistance test piece.

In the present invention, thermal shock test was performed by molding a C-shaped washer 1* as shown in FIG. 2 with a resin to be tested 2* and then subjecting the resulting test piece to the thermal cycling as shown in FIG. 3 until cracks developed.

The above-mentioned C-shaped washer method is a modification of Olyphant washer method devised by Mr. Olyphant of Minnesota Mining & Mfg. Co. which is described in "Thermal Shock Test for Castings, Proceedings, First National Conference on the Application of Electrical Insulation, Ohio, U.S.A. (September, 1958)". In the C-shaped method as performed in the present invention, as incision has been formed in the Olyphant washer into a C-shaped one to reduce the dispersion in the Olyphant washer method. As for the size of the washer, a notch of 4 mm in width has been formed in a carbon steel ring having an outside diameter of 40 mm, an inside diameter of 15 mm and a thickness of 5 mm to form a C-shaped washer. A test piece having an outside diameter of 57 mm and a thickness of 11 mm was prepared by molding the C-shaped washer with a resin to be used. The test piece was entered successively in thermostats as regulated to appointed temperatures, respectively, to heat the test piece according to the heat cycle schedule as shown in FIG. 3.

EXAMPLES 1-3

A bisphenol A epoxy resin DER-332 (manufactured by Dow Chemical Co., epoxy equivalent 174), diglycidyl ester of linolic acid dimer (Diels-Alder adduct) EP 871 (manufactured by Shell Co., epoxy equivalent 430), diphenylmethane diisocyanate (MDI) (Sumidur CD manufactured by Sumitomo-Bayer Co.) and 2-heptadecaimidazole were blended in the ratios as shown in Table 1 to obtain the compositions according to the present invention. The C-shaped washer was molded with these compositions to prepare three test pieces, which were subjected to heat cycle test. Curing conditions were 110° C/5 hours, 140° C/8 hours and then 180° C/15 hours.

Also, heat distortion temperature (HDT) according to ASTM D648-45T and bending strength according to JIS K-6911 were measured. The results obtained are shown in Table 2.

Table 1

|  | DER-332 (g) | EP 871 (g) | MID (g) | 2-Heptadecaimidazole (g) |
|---|---|---|---|---|
| Example 1 | 80 | 20 | 210 | 1.5 |
| Example 2 | 50 | 50 | 166 | 1.3 |
| Example 3 | 20 | 80 | 124 | 1.1 |
| Comparative Example 1 | 100 | — | 240 | 1.7 |
| Comparative Example 2 | — | 100 | 96 | 1.0 |

Table 2

|  | Heat cycle test, crack developing temperature (°C) | Bending strength (kg/cm$^2$) at 25°C | Deflection at break (%) | Young's modulus in flexure | HDT (°C) |
|---|---|---|---|---|---|
| Example 1 | −10 | 1,120 | 4.5 | 4.0 × 10$^4$ | >220 |
| Example 2 | −40 | 890 | 5.6 | 3.0 × 10$^4$ | 220 |
| Example 3 | −20 | 670 | 9.0 | 2.5 × 10$^4$ | 195 |
| Comparative Example 1 | Room temperature-* | 1,060 | 2.7 | 4.2 × 10$^4$ | >220 |
| Comparative Example 2 | Room temperature | 290 | 11.2 | 1.5 × 10$^4$ | 155 |

*Cracks developed when cooled to room temperature after curing.

As is clear from Table 2, thermal shock resistance was improved by the addition of EP 871 (a flexibilizer). When the amount of EP 871 added exceeded 80%, HDT was remarkably reduced.

EXAMPLE 4

40 Grams of a novolac epoxy resin (DEN 431 manufactured by Dow Chemical Co., epoxy equivalent 176), 10 g of diglycidyl ester of linolic acid dimer (EP 871 manufactured by Shell Co.), 86.4 g of diphenylmethane diisocyanate (MDI) (Sumidur CD manufactured by Sumitomo-Bayer Co.), 0.2 g of 1-cyanoethyl-2-ethyl-4-methylimidazole (hereinafter referred to as "2E4Mz-CN") and 2.0 g of an epoxysilane coupling 176), 10 g of diglycidyl ester of linolic acid dimer (EP 871 manufactured by Shell Co.), 86.4 g of diphenylmethane diisocyanate (MDI) (Sumidur CD manufactured by Sumitomo-Bayer Co.), 0.2 g of 1-cyanoethyl-2-ethyl-4-methylimidazole (hereinafter referred to as "2E4MZ-CN") and 2.0 g of an epoxysilane coupling agent (KBM 403 manufactured by Shin-etsu Chemical Industry Co., Ltd.) were mixed at 80° C. Thereto was added in portions 265 g of fused quartz glass powder (Fuselex RD-8 manufactured by Tatsumori Co.) with stirring and dispersed. Degasing was effected under reduced pressure of 1 mmHg for 5 minutes to obtain a thermosetting resin composition.

Three C-shaped washer test pieces were prepared from the composition. Curing conditions in this case were 115° C/15 hours, 140° C/8 hours and then 180° C/15 hours. Heat cycle test was performed up to −60° C, but no crack developed.

Also, their heat distortion temperature as measured according to ASTM D648-45T was higher than 225° C and their bending strengths as measured at 20° C and 180° C according to JIS K-6911 were 1,350 kg/cm² and 985 kg/cm², respectively. Thus, the composition was found to have excellent strengths even at high temperatures.

Further, when the above-mentioned test pieces were subjected to heat deterioration at 225° C for 40 days, weight loss was 2.3% and their bending strength at 180° C was 720 kg/cm². Thus, the composition was found to be very excellent in heat deterioration characteristic.

COMPARATIVE EXAMPLE 3

A casting resin was prepared with the following components in the same manner as in Example 1.

| DEN 431 | 50 g |
| MDI | 98 g |
| 2E4MZ-CN | 0.3 g |
| KBM 403 | 3.0 g |
| RD-8 | 288 g (51% by volume) |

When the thermal shock resistance of the resin was measured, cracks developed at 0° C in all the test pieces. Thus, the resin had very poor thermal shock resistance.

EXAMPLE 5

A casting resin was prepared with the following components in the same manner as in Example 1.

| DEN 431 | 25 g |
| EP 871 | 25 g |
| MDI | 69 g |
| 2E4MZ-CN | 0.24 g |
| KBM 403 | 2.4 g |
| RD-8 | 222 g (51 % by volume) |

When the thermal shock resistance of the resin was measured, no crack developed even at −60° C as in Example 1. Its bending strength was 1,180 kg/cm² at room temperature and 860 kg/cm² at 180° C, and its heat distortion temperature was higher than 225° C. Also, after heat deterioration at 225° C for 40 days, its bending strength was 690 kg/cm² at 180° C and its weight loss was 5.6%. Thus, the resin was found to have excellent thermal resistance.

EXAMPLE 6

A casting resin was prepared with the following components in the same manner as in Example 1.

| DER 332 | 25 g |
| EP 871 | 25 g |
| MDI | 97 g |
| 2E4MZ-CN | 0.3 g |
| KBM 403 | 3.0 g |
| RD-8 | 323 g (54 % by volume) |

When the thermal shock resistance of the resin was measured, no crack developed at −60° C. Its bending strength was 1,050 kg/cm² at room temperature and its heat distortion temperature was higher than 225° C.

EXAMPLE 7

The same test as in Example 1 was carried out by the use of the following components.

| DEN 431 | 10 g |
| EP 871 | 40 g |
| MDI | 51.6 g |
| 2E4MZ-CN | 0.2 g |
| KBM 403 | 2.0 g |
| RD-8 | 190 g (51 % by volume) |

When the thermal shock resistance of the resin was measured, cracks developed at −50° C. Its bending strength was 835 kg/cm² at room temperature and 580 kg/cm² at 180° C, and its heat distortion temperature was 202° C.

EXAMPLE 8

The same test as in Example 1 was carried out by the use of the following components.

| CY 183 (diglycidyl ester of hexahydrophthalic anhydride) | 25 g |
| EP 871 | 25 g |
| MDI | 72 g |
| 2E4MZ-CN | 0.2 g |
| KBM 403 | 2.4 g |
| RD-8 | 228 g (50 % by volume) |

The resin showed such thermal shock resistance as it endured thermal cycling up to −60° C. Its heat distortion temperature was 215° C and its bending strength at room temperature was 1,230 kg/cm².

COMPARATIVE EXAMPLE 4

| EP 871 | 50 g |
| MDI | 40 g |
| 2E4MZ-CN | 0.2 g |
| KBM 403 | 1.8 g |
| RD-8 | 183 g (52 % by volume) |

The same test as in Example 1 was carried out by the use of the above-mentioned components. The resulting resin showed such thermal shock resistance as cracks developed at 0° C and a heat distortion temperature of 160° C.

EXAMPLE 9

| DEN 431 | 25 g |
| EP 871 | 25 g |
| MDI | 41.4 g |
| 2E4MZ-CN | 0.2 g |
| KBM 403 | 1.8 g |
| RD-8 | 171 g (50 % by volume) |

The same test as in Example 1 with the above-mentioned blending ratio. The resulting resin showed such thermal shock resistance as it endured thermal cycling up to −60° C. Its heat distortion temperature was 207°

C and its bending strength at room temperature was 1,020 kg/cm².

EXAMPLE 10

| DEN 431 | 25 g |
| --- | --- |
| EP 871 | 25 g |
| MDI | 69 g |
| N-Methylmorpholine | 0.24 g |
| KBM 403 | 2.4 g |
| RD-8 | 222 g (51 % by volume) |

The same test as in Example 1 was carried out with the above-mentioned blending ratio. The resulting resin showed such thermal resistance as it endured thermal cycling up to −60° C. Its heat distortion temperature was more than 225° C.

EXAMPLE 11

| DEN 431 | 25 g |
| --- | --- |
| EP 871 | 25 g |
| Xylylenediisocyanate | 52 g |
| 2E4MZ-CN | 0.2 g |
| KBM 403 | 2.0 g |
| RD-8 | 234 g (55 % by volume) |

The same test as in Example 1 was carried out with the above-mentioned blending ratio. The resulting resin showed such thermal shock resistance as it endured thermal cycling up to −60° C. Its heat distortion temperature was 180° C.

COMPARATIVE EXAMPLE 5

The same test as in Example 1 was carried out by using as a flexibilizer diglycidyl ether of butanediol DY 022 (manufactured by Ciba Co., epoxy equivalent 137) in place of EP 871.

| DEN 431 | 25 g |
| --- | --- |
| DY 022 | 25 g |
| MDI | 112 g |
| 2E4MZ-CN | 0.3 g |
| KBM 403 | 3.2 g |
| RD-8 | 327 g (52 % by volume) |

The resulting resin showed such thermal shock resistance as cracks developed in all of three test pieces only by cooling to room temperature after curing. Thus, its thermal shock resistance was found to be very poor.

COMPARATIVE EXAMPLE 6

The same test as in Example 1 was carried out by using as a flexibilizer diglycidyl ether of polypropylene glycol DER 732 (manufactured by Dow Chemical Co., epoxy equivalent 320) in place of EP 871.

| DEN 431 | 25 g |
| --- | --- |
| DER 732 | 25 g |
| MDI | 76 g |
| 2E4MZ-CN | 0.25 g |
| KBM 403 | 2.5 g |
| RD-8 | 277 g |

The resulting resin showed such thermal resistance as cracks developed in all of three test pieces only by cooling to room temperature after curing. Thus, the thermal shock resistance of the resin was very poor.

EXAMPLE 12

| DEN 431 | 45 g |
| --- | --- |
| EP 871 | 5 g |
| MDI | 92.2 g |
| 2E4MZ-CN | 0.3 g |
| KBM 403 | 2.8 g |
| RD-8 | 277 g (51 % by volume) |

In the heat cycle test of the resulting resin, cracks developed at −50° C.

COMPARATIVE EXAMPLE 7

| DEN 431 | 5 g |
| --- | --- |
| EP 871 | 45 g |
| MDI | 46 g |
| 2E4MZ-CN | 0.2 g |
| KBM 403 | 2.0 g |
| RD-8 | 180 g (50 % by volume) |

The resulting resin showed such thermal shock resistance as cracks developed at −30° C.

COMPARATIVE EXAMPLE 8

| DEN 431 | 47.5 g |
| --- | --- |
| EP 871 | 2.5 g |
| MDI | 95.3 g |
| 2E4MZ-CN | 0.3 g |
| KBM 403 | 2.9 g |
| RD-8 | 283 g (51 % by volume) |

In the heat cycle test of the resulting resin, cracks developed at −20° C.

EXAMPLES 13–15

A Diels-Alder adduct obtained by reacting one mole of linolic acid with one mole of oleic acid was epoxidized with excess epichlorohydrin to obtain a liquid diglycidyl ester compound having an epoxy equivalent of 420. This is hereinafter referred to as "flexibilizer A".

Table 3

| | Novolac* epoxy compound | Flexibilizer A | MDI | 2-Phenyl imidazole | Fused quartz glass powder |
| --- | --- | --- | --- | --- | --- |
| Example 13 | 40 g | 10 g | 90 g | 0.3 g | 140 g |
| Example 14 | 30 | 20 | 80 | 0.3 | 130 |
| Example 15 | 20 | 30 | 65 | 0.2 | 115 |
| Comparative Example 9 | 50 | — | 100 | 0.3 | 150 |
| Example 10 | — | 50 | 42 | 0.2 | 92 |

*Epoxy equivalent 176

Each three test pieces were prepared by molding a C-shaped washer with the above-mentioned compositions. The curing conditions for the test pieces were 110° C/5 hours and then 180° C/10 hours.

For comparison, the test was also carried out with regard to a composition wherein said flexibilizer A had not been added as an epoxy compound component as well as a composition wherein only the flexibilizer A had been used as an epoxy compound component.

Heat cycle test results, bending strength and weight loss after heating at 225° C for 40 days of the above-mentioned compositions are shown in Table 4.

Table 4

| | Heat cycle test, crack developing temperature (° C) | Bending Strength (kg/cm²) | | After heating at 225° C for 40 days at 180° C | Weight loss after heating at 225° C for 40 days (%) |
|---|---|---|---|---|---|
| | | Initial at 20° C | at 180° C | | |
| Example 13 | −30 | 1,240 | 980 | 760 | 3.5 |
| Example 14 | −50 | 1,210 | 910 | 630 | 4.8 |
| Example 15 | −60 | 1,120 | 860 | 550 | 5.6 |
| Comparative Example 9 | Room temperature | 1,220 | 1,050 | 910 | 3.0 |
| Example 10 | 10 | 970 | 230 | 150 | 9.3 |

EXAMPLES 16–18

A Diels-Alder adduct obtained by reacting one mole of linolic acid with one mole of linderic acid and a Diels-Alder adduct obtained by reacting one mole of linolic acid with one mole of 5-hexenoic acid were respectively epoxidized with excess epichlorohydrin to obtain two liquid diglycidyl ester compounds. The former product is referred to as "flexibilizer B" and the latter product is referred to as "flexibilizer C".

Table 5

| | Diglycidyl ester of HHPA* | Flexibilizer | MDI | 2-Ethyl-4-methyl-imidazole | Fused quartz glass powder |
|---|---|---|---|---|---|
| Example 16 | 25g | A 25g | 70g | 0.1g | 220g |
| Example 17 | 25 | B 25 | 70 | 0.1 | 220 |
| Example 18 | 25 | C 25 | 70 | 0.1 | 220 |

*HHPA: Hexahydrophthalic anhydride

The thermal shock resistance, bending strength and heating loss of the cured products obtained by curing the thermosetting resin compositions as described in Table 5 under the same conditions as in Example 13 are shown in Table 6.

Table 6

| | Heat cycle test, crack developing temperature (° C) | Bending strength (kg/cm²) | | after heating at 225° C for 40 days at 180° C | Weight loss after heating at 225° C for 40 days % |
|---|---|---|---|---|---|
| | | Initial at 20° C | at 180° C | | |
| Example 16 | <−60 | 1,220 | 880 | 620 | 3.8 |
| Example 17 | −60 | 1,200 | 760 | 610 | 4.0 |
| Example 18 | −10 | 1,290 | 790 | 490 | 4.2 |

Table 6 shows that the Diels-Alder adduct (having 24 carbon atoms) prepared from linolic acid and 5-hexenoic acid is poor in an effect for the heat cycle test.

EXAMPLES 19–21

Diglycidyl ester of linolenic acid dimer was obtained by epoxidizing with epichlorohydrin the dimeric acid obtained from linolenic acid by Diels-Alder reaction. The product is hereinafter referred to as "flexibilizer D".

The characteristics of the thermosetting resin compositions as shown in Table 7 are shown in Table 8. The curing conditions were 110° C/15 hours, 140° C/8 hours and then 180° C/15 hours.

Table 7

| | Novolac* epoxy compound | Flexibilizer D | MDI | 2-Phenyl-imidazole | Fused quartz glass powder |
|---|---|---|---|---|---|
| Ex. 19 | 40g | 10g | 85g | 0.14g | 230g |
| Ex. 20 | 30 | 20 | 75 | 0.13 | 218 |
| Ex. 21 | 20 | 30 | 60 | 0.11 | 187 |
| Comparative Ex. 11 | 50 | — | 93 | 0.14 | 243 |
| Ex. 12 | — | 50 | 38 | 0.09 | 150 |

*Epoxy equivalent 176

Table 8

| | Heat cycle test, crack developing temperature (° C) | Bending strength (kg/cm²) | | after heating at 225° C for 40 days at 180° C | Weight loss after heating at 225° C for 40 days % |
|---|---|---|---|---|---|
| | | Initial at 20° C | at 180° C | | |
| Example 19 | <−60 | 1,100 | 830 | 480 | 2.8 |
| Example 20 | <−60 | 1,110 | 760 | 450 | 3.7 |
| Example 21 | <−60 | 1,050 | 690 | 440 | 4.2 |
| Comparative Example 11 | 0 | 1,160 | 975 | 620 | 2.2 |
| Example 12 | −10 | 880 | 250 | 180 | 7.1 |

EXAMPLES 22–25

The thermosetting resin compositions as shown in Table 9 were prepared by using a diglycidyl ester of a dimeric acid obtained from a dimeric acid of linolenic acid and 5-hexenoic acid (flexibilizer E), that obtained from a dimeric acid of linolenic acid and linderic acid (flexibilizer F) and that obtained from dimeric acid and arachidonic acid and selacholeic acid (flexibilizer G).

Table 9

| | Diglycidyl ester of HHPA* | Flexibilizer | MDI | 2-Ethyl-4-methyl-imidazole | Fused quartz glass powder |
|---|---|---|---|---|---|
| Example 22 | 25g | D 25g | 70g | 0.1g | 220g |
| Example 23 | 25 | E 25 | 70 | 0.1 | 220 |
| Example 24 | 25 | F 25 | 70 | 0.1 | 220 |
| Example 25 | 25 | G 25 | 70 | 0.1 | 220 |

*HHPA: Hexahydrophthalic anhydride

The characteristics of the cured products obtained by curing the above-mentioned compositions under the same curing conditions as in Example 19 are shown in Table 10.

Table 10

| | Heat cycle test, crack developing temperature (°C) | Bending strength (kg/cm²) | | After heating at 225° C for 40 days at 180°C | Weight loss after heating at 225° C for 40 days % |
|---|---|---|---|---|---|
| | | Initial at 20°C | at 180°C | | |
| Example 22 | <−60 | 1,120 | 770 | 510 | 3.9 |
| Example 23 | −20 | 1,250 | 890 | 530 | 4.7 |
| Example 24 | −60 | 1,350 | 840 | 470 | 4.3 |
| Example 25* | — | — | — | — | — |

*Such a uniformly dispersed state as in the present invention was not obtained since the components were immiscible with one another.

As is clear from the above table, the dimeric acid (having 44 carbon atoms) of arachidonic acid and selacholeic acid did not give a cured product which was an object of the present invention.

EXAMPLES 26-28

A polyglycidyl ester having an epoxy equivalent of 390 was obtained by reacting with excess epichlorohydrin in the presence of sodium hydroxide a polycarboxylic acid obtained by heating at 200° C for 5 hours a mixture of 284 g (1 mole) of linolic acid and 1.4 g of di-tert-butyl peroxide, The product is hereinafter referred to as "flexibilizer H".

Table 11

|  | Novolac* epoxy compound | Flexibilizer H | MDI | 2-Phenyl-imidazole | Fused quartz glass powder |
|---|---|---|---|---|---|
| Example 26 | 40ᵍ | 10ᵍ | 82ᵍ | 0.13ᵍ | 232ᵍ |
| Example 27 | 30 | 20 | 77 | 0.13 | 224 |
| Example 28 | 20 | 30 | 66 | 0.12 | 204 |
| Comparative |  |  |  |  |  |
| Example 13 | 50 | — | 100 | 0.15 | 264 |
| Example 14 | — | 50 | 44 | 0.10 | 165 |

*Epoxy equivalent 176

The characteristics of the cured products obtained by curing the above-mentioned compositions under the same conditions as in Example 19 are shown in Table 12.

Table 12

|  | Heat cycle test, crack developing temperature (°C) | Bending strength (kg/cm²) | | After heating at 225° C for 40 days at 180°C | Weight loss after heating at 225° C for 40 days % |
|---|---|---|---|---|---|
|  |  | Initial at 20°C | at 180°C |  |  |
| Example 26 | −60 | 1,310 | 870 | 660 | 2.9 |
| Example 27 | <−70 | 1,190 | 790 | 590 | 3.4 |
| Example 28 | <−70 | 980 | 680 | 550 | 3.9 |
| Comparaive |  |  |  |  |  |
| Example 13 | Room temperature | 1,280 | 1,010 | 880 | 2.4 |
| Example 14 | 10 | 760 | 220 | 120 | 8.5 |

EXAMPLES 29-32

A diglycidyl ester of a polycarboxylic acid obtained with 5-hexenoic acid is referred to as "flexibilizer I", that obtained with linolenic acid is referred to as "flexibilizer J", and that obtained with selacholeic acid is referred to as "flexibilizer K".

Table 13

|  | Diglycidyl ester of HHPA* | Flexibilizer | MDI | 2-Ethyl-4-methyl-imidazole | Fused quartz glass powder |
|---|---|---|---|---|---|
| Example 29 | 25ᵍ | H 25ᵍ | 70ᵍ | 0.1ᵍ | 220ᵍ |
| Example 30 | 25 | I 25 | 70 | 0.1 | 220 |
| Example 31 | 25 | J 25 | 70 | 0.1 | 220 |
| Example 32 | 25 | K 25 | 70 | 0.1 | 220 |

*HHPA: Hexahydrophthalic anhydride

The characteristics of the cured products obtained by curing the above-mentioned compositions under the same curing conditions as in Example 19 are shown in Table 14.

Table 14

|  | Heat cycle test, crack developing temperature (°C) | Bending strength (kg/cm²) | | After heating at 225°C for 40 days at 180°C | Weight loss after heating at 225°C for 40 days % |
|---|---|---|---|---|---|
|  |  | Initial at 20°C | at 180°C |  |  |
| Example 29 | <−60 | 1,380 | 820 | 630 | 4.2 |
| Example 30 | −10 | 1,370 | 1,050 | 740 | 3.9 |
| Example 31 | <−60 | 1,403 | 865 | 590 | 4.8 |
| Example 32* | — | — | — | — | — |

*Such a uniformly dispersed state as in the present invention was not obtained since the components were immiscible with one another.

EXAMPLE 33

Figure 4:
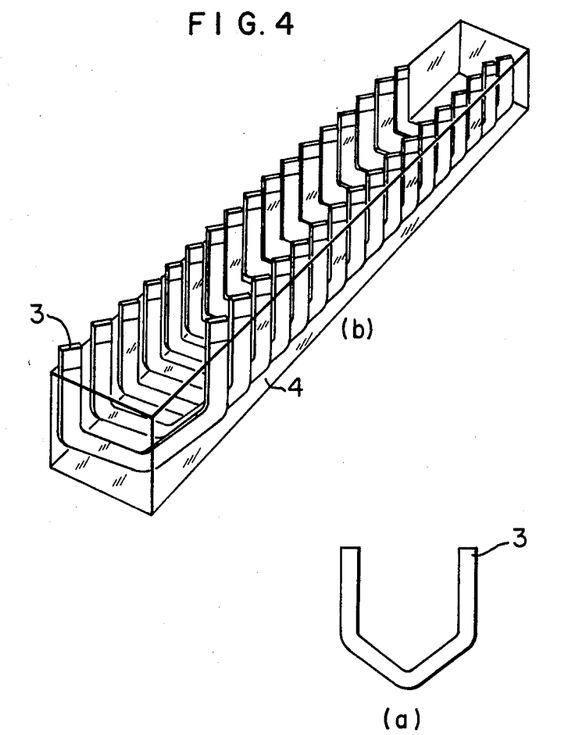
FIG. 4 shows a model coil for a rotary machine as used in the test of Example 33.

A model coil 3 having such a shape as obtained by cutting into halves a diamond coil for rotary electric machines, as shown in FIG. 4 (a), was formed with flat type copper wire (10 mm × 20 mm × length 450 mm). Seventeen such model coils were arranged as shown in FIG. 4 (b) and molded with the thermosetting resin composition 4 having the composition as described below. The above-mentioned rotary electric machine model coil was 100 mm × 100 mm × length 1,000 mm in size. After casting at 80° C and 1 atm, curing was effected at 110° C/15 hours, 140° C/8 hours and then 180° C/15 hours.

| Novolac epoxy resin (epoxy equivalent 174) | 80 g |
|---|---|
| Polyglycidyl ester of linolic acid dimer (epoxy equivalent 430) | 20 g |
| MDI | 172 g |
| 1-Cyanoethyl-2-ethyl-3-ethylimidazole | 0.2 g |
| KBM 403 | 4.0 g |
| Fused quartz glass powder | 530 g |

When the above-mentioned rotary electric machine model coil was subjected to thermal cycling of 180° C/2 hours to −30° C/2 hours 20 times, no crack was observed in the molded resin.

COMPARATIVE EXAMPLE 15

In the resin composition of Example 33, 100 g of the novalac epoxy resin (epoxy equivalent 174) was used without adding the polyglycidyl ester of linolic acid dimer. In this case, cracks developed at portions where the molded resin was in contact with the copper coil when the model coil for rotary electric machines was cooled to room temperature after curing.

Also, the same model coil for rotary electric machines as in Example 33 was prepared by the use of the epoxy resin composition described below which was considered to have comparatively good thermal shock resistance. When the model coil was cooled to room temperature after curing, however, cracks developed in the molded resin at the portion at half the height from the top of the coil.

| 3,4-Epoxycyclohexylmethyl (3,4-epoxy)cyclohexane-carboxylate | 60 g |
|---|---|
| Bisphenol A epoxy resin (epoxy equivalent 410) | 40 g |
| Vinylcyclohexene dioxide | 20 g |
| Methyltetrahydrophthalic anhydride | 240 g |
| Benzyldimethylamine | 1 g |

| -continued | |
|---|---|
| Quartz glass powder | 540 g |

What is claimed is:

1. A thermosetting resin composition consisting essentially of (a) one equivalent of a polyfunctional epoxy compound containing 10 to 80% by weight of a polyglycidyl ester obtained from a polymer or Diels-Alder adduct of an unsaturated fatty acid and an epihalohydrin, (b) 1.5 to 5 equivalents of a polyisocyanate compound and (c) 0.01 to 10% by weight of a curing catalyst based on the total weight of the polyfunctional epoxy compound and the polyisocyanate compound, said curing catalyst being a basic catalyst capable of facilitating isocyanurate and oxazolidone ring formation and being at least one member selected from the group consisting of a tertiary amine, an imidazole and a quaternary ammonium salt containing an alkyl group of 8 or more carbon atoms, said thermosetting resin composition upon curing exhibiting thermal resistance and thermal shock resistance and having a rigid resin part consisting mainly of the polyfunctional epoxy compound and the polyisocyanate compound in the form of a matrix and a flexible resin part consisting mainly of the polyglycidyl ester and the polyisocyanate compound uniformly distributed in the form of fine spheres in the matrix.

2. A thermosetting resin composition according to claim 1, wherein said polymer or Diels-Alder adduct of an unsaturated fatty acid has 25 to 43 carbon atoms.

3. A thermosetting resin composition according to claim 1, wherein said polyfunctional epoxy compound contains 20 to 60% by weight of said polyglycidyl ester.

4. A process for producing a thermoset resin which comprises curing at a temperature in the range of 50° C to 250° C a thermosetting composition consisting essentially of (a) one equivalent of a polyfunctional epoxy compound containing 10 to 80% by weight of a polyglycidyl ester obtained from a polymer or Diels-Alder adduct of an unsaturated fatty acid and an epihalohydrin, (b) 1.5 to 5 equivalents of a polyisocyanate compound and (c) 0.01 to 10% by weight of a curing catalyst based on the total weight of the polyfunctional epoxy compound and the polyisocyanate compound, said curing catalyst being a basic catalyst capable of facilitating isocyanurate and oxazolidone ring formation and being at least one member selected from the group consisting of a tertiary amine, an imidazole and a quaternary ammonium salt containing an alkyl group of 8 or more carbon atoms, said thermoset resin exhibiting thermal resistance and thermal shock resistance and having a rigid resin part consisting mainly of the polyfunctional epoxy compound and the polyisocyanate compound in the form of a matrix and a flexible resin part consisting mainly of the polyglycidyl ester and the polyisocyanate compound uniformly distributed in the form of fine spheres in the matrix.

5. A process according to claim 4, wherein said polymer or Diels-Alder adduct of an unsaturated fatty acid has 25 to 43 carbon atoms.

6. A thermosetting resin composition according to claim 1, wherein said polyfunctional epoxy compound is selected from the group consisting of diglycidyl ether of bisphenol A, diglycidyl ether of butanediol, diglycidyl ester of phthalic acid, diglycidyl ester of isophthalic acid, diglycidyl ester of terephthalic acid, diglycidyl ester of tetrahydrophthalic acid, diglycidyl ester of hexahydrophthalic acid, diglycidyl ester of methylnadic acid, butadienediepoxide, 4,4'-(1,2-epoxyethyl)-biphenyl, diglycidyl ether of resorcinol, diglycidyl ether of phloroglucinol, diglycidyl ether of methylphloroglucinol, triglycidyl ether of p-aminophenol, a polyarylglycidyl ester, 1,3,5-tri(1,2-epoxyethyl)benzene, 2,2',4,4'-tetraglycidoxybenzophenone, tetraglycidoxytetraphenylethane, a polyglycidyl ether of a phenol-formaldehyde novolac resin, triglycidyl ether of glycerol, triglycidyl ether of trimethylolpropane, triglycidyl ester of trimellitic acid, and tetraglycidyl ester of pyromellitic acid.

7. A thermosetting resin composition according to claim 6, wherein said polyfunctional epoxy compound is selected from the group consisting of diglycidyl ether of bisphenol A, diglycidyl ester of phthalic acid, diglycidyl ester of isophthalic acid, diglycidyl ester of isophthalic acid, diglycidyl ester of terephthalic acid and polyglycidyl ether of a phenol novolac resin.

8. A thermosetting resin composition according to claim 1, wherein said polyisocyanate compound is selected from the group consisting of methane diisocyanate, butane-1,1-diisocyanate, ethane-1,2-diisocyanate, butane-1,2-diisocyanate, propane-1,3-diisocyanate, 2-butene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilane diisocyanate, diphenylsilane diisocyanate, ω,ω'-1,3-dimethylbenzene diisocyanate, ω,ω'-1,4-dimethylbenzene diisocyanate, ω,ω'-1,3-dimethylcyclohexane diisocyanate, ω,ω'-1,4-dimethylcyclohexane diisocyanate, ω,ω'-1,4-dimethylnaphthalene diisocyanate, ω,ω'-1,5-dimethylnaphthalene diisocyanate, cyclohexane-1,3-diisocyanate, cyclohexane-1,4-diisocyanate, dicyclohexylmethane-4,4'-diisocyanate, 1,3-phenylenediisocyanate, 1,4-phenylenediisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenylether-4,4'-diisocyanate, diphenylether-2,4'-diisocyanate, naphthalene-1,4-diisocyanate, naphthalene-1,5-diisocyanate, biphenyl-4,4'-diisocyanate, 3,3'-dimethylbiphenyl-4,4'-diisocyanate, 2,3'-dimethoxybiphenyl-4,4'-diisocyanate, diphenylmethane-4,4'-diisocyanate, 3,3'-dimethoxyphenylmethane-4,4'-diisocyanate, 4,4'-dimethoxydiphenylmethane-3,3'-diisocyanate, diphenylsulfide-4,4'-diisocyanate, diphenylsulfon-4,4'-diisocyanate, polymethylenepolyphenylisocyanates, tris(4-phenylisocyanate)thiophosphate, 3,3',4,4'-diphenylmethanetetraisocyanate, and dimers and trimers thereof.

9. A thermosetting resin composition according to claim 8, wherein said polyisocyanate compound is selected from the group consisting of diphenylmethane-4,4'-diisocyanate, ω,ω-1,3-dimethylbenzene diisocyanate and ω,ω'-1,4-dimethylbenzene diisocyanate.

10. A thermosetting resin composition according to claim 1, wherein said unsaturated fatty acid of said polymer or Diels-Alder adduct is selected from the group consisting of 5-hexenoic acid, 4-decenoic acid, caproleic acid, linderic acid, lauroleic acid, tsuzuic acid, myristoleic acid, palmitoleic acid, petroselinic acid, oleic acid, vaccenic acid, gadoleic acid, erucic acid, selacholeic acid, linolic acid, linolenic acid, eleostearic acid, parinaric acid and arachidonic acid.

11. A thermosetting resin composition according to claim 10, wherein said polymer or Diels-Alder adduct has from 25 to 43 carbon atoms.

12. A thermosetting resin composition according to claim 11, wherein said Diels-Alder adduct is selected from the group consisting of linolic acid dimer, linolenic acid dimer, linolic-oleic acid adduct, linolic-linderic acid adduct and linolenic-linderic acid adduct.

13. A thermosetting resin composition according to claim 10, wherein said fatty acid is selected from the group consisting of 5-hexenoic acid, oleic acid, linderic acid, linolic acid and linolenic acid.

14. A molded thermoset composition comprising a resin containing isocyanurate and oxazolidone rings produced by curing at a temperature in the range of 50° C to 250° C, a thermosetting resin consisting essentially of (a) one equivalent of a polyfunctional epoxy compound containing 10 to 80% by weight of a polyglycidyl ester obtained from a polymer or Diels-Alder adduct of an unsaturated fatty acid and an epihalohydrin, (b) 1.5 to 5 equivalents of a polyisocyanate compound, and (c) 0.01 to 10% by weight of a curing catalyst based on the total weight of the polyfunctional epoxy compound and the polyisocyanate compound, said curing catalyst being a basic catalyst capable of facilitating isocyanaurate and oxazolidone ring formation and being at least one member selected from the group consisting of a tertiary amine, an imidazole and a quaternary ammonium salt containing an alkyl group of 8 or more carbon atoms; an inorganic filler and a coupling agent, said molded thermoset composition exhibiting thermal resistance and thermal shock resistance and having a rigid resin part consisting mainly of the polyfunctional epoxy compound and the polyisocyanate compound in the form of a matrix and a flexible resin part consisting mainly of the polyglycidyl ester and the polyisocyanate compound uniformly distributed in the form of fine spheres in the matrix.

15. A molded thermoset composition according to claim 14, wherein said polymer or Diels-Alder adduct of an unsaturated fatty acid has 25 to 43 carbon atoms.

16. A molded thermoset composition according to claim 14, wherein said polyfunctional epoxy compound contains 20 to 60% by weight of said polyglycidyl ester.

17. A molded thermoset composition according to claim 14, wherein said inorganic filler is selected from the group consisting of silica, alumina, diatomaceous earth, glass powder, quartz glass powder, mica, clay, calcium carbonate, gypsum, magnesite, kaolin, talc, dolomite, graphite, carbon black, iron carbonyl, asbestos, cement, whisker, zircon, ferrite, molybdenum disulfide, zinc white and titanium white.

18. A molded thermoset composition according to claim 14, wherein said coupling agent is an epoxysilane or an aminosilane.

19. A molded thermoset composition consisting essentially of a resin containing isocyanurate and oxazolidone rings produced by curing at a temperature in the range of 50° C to 250° C, a thermosetting resin consisting essentially of (a) one equivalent of a polyfunctional epoxy compound containing 10 to 80% by weight of a polyglycidyl ester obtained from a polymer or Diels-Alder adduct of an unsaturated fatty acid and an epihalohydrin, (b) 1.5 to 5 equivalents of a polyisocyanate compound, and (c) 0.01 to 10% by weight of a curing catalyst based on the total weight of the polyfunctional epoxy compound and the polyisocyanate compound, said curing catalyst being a basic catalyst capable of facilitating isocyanurate and oxazolidone ring formation and being at least one member selected from the group consisting of a tertiary amine, an imidazole and a quarternary ammonium salt containing an alkyl group of 8 or more carbon atoms; an inorganic filler and a coupling agent, said molded thermoset composition exhibiting thermal resistance and thermal shock resistance and having a rigid resin part consisting mainly of the polyfunctional epoxy compound and the polyisocyanate compound in the form of a matrix and a flexible resin part consisting mainly of the polyglycidyl ester and the polyisocyanate compound uniformly distributed in the form of fine spheres in the matrix.

20. A molded thermoset composition according to claim 19, wherein said unsaturated fatty acid of said polymer or Diels-Alder adduct is selected from the group consisting of 5-hexenoic acid, 4-decenoic acid, caproleic acid, linderic acid, lauroleic acid, tsuzuic acid, myristoleic acid, palmitoleic acid, petroselinic acid, oleic acid, vaccenic acid, gadoleic acid, erucic acid, selacholeic acid, linolic acid, linolenic acid, eleostearic acid, parinaric acid and arachidonic acid.

21. A molded thermoset composition according to claim 19, wherein said polymer or Diels-Alder adduct has from 25 to 43 carbon atoms.

22. A molded thermoset composition according to claim 21, wherein said Diels-Alder adduct is selected from the group consisting of linolic acid dimer, linolenic acid dimer, linolic-acid adduct, linolic-linderic acid adduct and linolenic-linderic acid adduct.

23. A molded thermoset composition according to claim 19, wherein said fatty acid is selected from the group consisting of 5-hexenoic acid, oleic acid, linderic acid, linolic acid and linolenic acid.

24. A molded thermoset composition according to claim 19, wherein said inorganic filler is selected from the group consisting of silica, alumina, diatomaceous earth, glass powder, quartz glass powder, mica, clay, calcium carbonate, gypsum, magnesite, kaolin, talc, dolomite, graphite, carbon black, iron carbonyl, asbestos, cement, whisker, zircon, ferrite, molybdenum disulfide, zinc white and titanium white.

25. A molded thermoset composition according to claim 22, wherein said inorganic filler is quartz glass powder.

26. A molded thermoset composition according to claim 22, wherein said inorganic filler is present in an amount up to 60% by volume of the molded thermoset composition.

27. A molded thermoset composition according to claim 24, wherein said inorganic filler is present in the range of 45 to 55% by volume of the molded thermoset composition.

28. A molded thermoset composition according to claim 19 wherein said curing catalyst is selected from the group consisting of 2-heptadecaimidazole, 1-cyanoethyl-2-ethyl-4-methylimidazole and 1-cyanoethyl-2-ethyl-3-ethylimidazole.

29. A molded thermoset composition consisting essentially of a resin containing isocyanurate and oxazolidone rings produced by curing at a temperature in the range of 50° C to 250° C, a thermosetting resin composition consisting essentially of (a) one equivalent of a polyfunctional epoxy compound containing 10 to 80% by weight of a polyglycidyl ester obtained from a polymer or Diels-Alder adduct of an unsaturated fatty acid and an epihalohydrin, (b) 1.5 to 5 equivalents of a polyisocyanate compound and (c) 0.01 to 10% by weight of a curing catalyst based on the total weight of the polyfunctional epoxy compound and the polyisocyanate compound, said curing catalyst being a basic catalyst capable of facilitating isocyanurate and oxazolidone ring formation and being at least one member selected from the group consisting of a tertiary amine, an imidazole and a quarternary ammonium salt containing an alkyl group of 8 or more carbon atoms, said molded thermoset composition exhibiting thermal resistance and thermal shock resistance and having a rigid resin part consisting mainly of the polyfunctional epoxy compound and the polyisocyanate compound in the form of a matrix and a flexible resin part consisting mainly of the polyglycidyl ester and the polyisocyanate compound uniformly distributed in the form of fine spheres in the matrix.

* * * * *